United States Patent
Baba et al.

(10) Patent No.: US 10,642,212 B2
(45) Date of Patent: May 5, 2020

(54) PHOTOCONDUCTOR DRUM, DRIVE SHAFT, PHOTOCONDUCTOR DRUM SYSTEM, IMAGE-FORMING APPARATUS, AND MULTIFUNCTION APPARATUS

(71) Applicant: SHARP KABUSHIKI KAISHA, Sakai, Osaka (JP)

(72) Inventors: Kouki Baba, Sakai (JP); Rikiya Matsuo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/186,274

(22) Filed: Nov. 9, 2018

(65) Prior Publication Data
US 2019/0146401 A1    May 16, 2019

(30) Foreign Application Priority Data
Nov. 10, 2017    (JP) .................................. 2017-217481

(51) Int. Cl.
| | |
|---|---|
| *G03G 15/00* | (2006.01) |
| *G03G 21/16* | (2006.01) |
| *B65H 27/00* | (2006.01) |
| *F16C 13/00* | (2006.01) |

(52) U.S. Cl.
CPC ......... *G03G 15/757* (2013.01); *G03G 15/751* (2013.01); *B65H 27/00* (2013.01); *F16C 13/00* (2013.01); *G03G 21/1647* (2013.01)

(58) Field of Classification Search
CPC .............. G03G 15/757; G03G 15/751; G03G 21/1647; G03G 15/75; F16C 3/02; F16C 3/023; F16C 3/026; F16C 13/00; B65H 27/00
See application file for complete search history.

(56) References Cited

U.S. PATENT DOCUMENTS

| | | | |
|---|---|---|---|
| 4,165,551 A * | 8/1979 | Rosseau ................. | A46B 13/02 15/179 |
| 8,407,846 B2 * | 4/2013 | Chen ................. | H01L 21/67046 15/179 |
| 2002/0025191 A1* | 2/2002 | Kitayama ................. | F16D 3/44 399/222 |
| 2005/0031374 A1* | 2/2005 | Nagashima ........ | G03G 15/5008 399/117 |
| 2012/0213544 A1* | 8/2012 | Ooyoshi ............. | G03G 15/751 399/90 |
| 2014/0133886 A1* | 5/2014 | Kurokawa ........... | G03G 21/186 399/167 |
| 2014/0212174 A1 | 7/2014 | Hayashi | |

FOREIGN PATENT DOCUMENTS

| | | | |
|---|---|---|---|
| JP | 60202009 A | * | 10/1985 |
| JP | 2014-145467 A | | 8/2014 |

* cited by examiner

*Primary Examiner* — David M. Gray
*Assistant Examiner* — Laura Roth
(74) *Attorney, Agent, or Firm* — ScienBiziP, P.C.

(57) ABSTRACT

A photoconductor drum includes a drum body that is cylindrical, and a pair of flanges fitted to or near two axial ends of the drum body, wherein at least one of the flanges includes a plurality of engagement protrusions disposed on an inner circumferential surface of a through-hole for inserting a drive shaft for drivingly rotating the photoconductor drum, the through-hole having a larger radius than the drive shaft.

16 Claims, 12 Drawing Sheets

FIG. 12

| | CONDITIONS | | | | EVALUATION ITEMS | | | | |
|---|---|---|---|---|---|---|---|---|---|
| | NUMBER OF PROTRUSIONS | ARRANGEMENT OF PROTRUSIONS | HEIGHT OF PROTRUSIONS [μm] | GAP WIDTH BETWEEN OUTER CIRCUMFERENCE AND INNER CIRCUMFERENCE [μm] | RUNOUT [μm] | EVALUATION OF RUNOUT | IMAGE QUALITY | WORK-ABILITY | OVERALL |
| EXAMPLE 1 | 3 | EQUALLY ARRANGED IN CIRCUMFERENTIAL DIRECTION | 40 | 20 | 31 | G | G | G | G |
| EXAMPLE 2 | 6 | ADDITIONAL PROTRUSIONS DISPOSED ON LEADING-END SIDE | 40 | 20 | 27 | G | G | G | G |
| EXAMPLE 3 | 6 | ADDITIONAL PROTRUSIONS DISPOSED ON LEADING-END SIDE AND HAVING LARGER SIZE | TRAILING-END-SIDE PROTRUSIONS: 40 LEADING-END-SIDE PROTRUSIONS: 50 | 20 | 23 | VG | VG | G | VG |
| EXAMPLE 4 | 3 | PROTRUSIONS DISPOSED ON RIBS | 40 | 20 | 28 | G | G | G | G |
| EXAMPLE 5 | 3 | PROTRUSIONS IN HELICAL ARRANGEMENT | 40 | 20 | 36 | G | G | VG | VG |
| COMPARATIVE EXAMPLE 1 | 0 | NONE | 0 | 20 | 44 | B | B | VG | B |
| COMPARATIVE EXAMPLE 2 | 0 | NONE | 0 | 0 | 28 | VG | VG | B | B |
| COMPARATIVE EXAMPLE 3 | 1 | ONE PROTRUSION | 40 | 20 | 42 | B | B | G | B |
| COMPARATIVE EXAMPLE 4 | 2 | TWO PROTRUSIONS EQUALLY ARRANGED | 40 | 20 | 44 | B | B | G | B |
| COMPARATIVE EXAMPLE 5 | 3 | PROTRUSIONS UNEQUALLY ARRANGED IN CIRCUMFERENTIAL DIRECTION | 40 | 20 | 43 | B | B | G | B |

PHOTOCONDUCTOR DRUM, DRIVE SHAFT, PHOTOCONDUCTOR DRUM SYSTEM, IMAGE-FORMING APPARATUS, AND MULTIFUNCTION APPARATUS

BACKGROUND

1. Field

The present disclosure relates to a photoconductor drum, a drive shaft, a photoconductor drum system including the photoconductor drum and the drive shaft, and an image-forming apparatus and a multifunction apparatus that include the photoconductor drum system.

2. Description of the Related Art

An image-forming apparatus employing an electrophotographic system includes a cylindrical photoconductor drum rotating around a shaft, and devices surrounding the photoconductor drum, such as a charging device, an exposure device, a development device, and a transfer roller. During formation of an image, the surface of the photoconductor drum is temporarily charged with the charging device, and, on the charged surface, a latent image is formed with the exposure device; a toner image is formed in accordance with the latent image with the development device; and this toner image is transferred onto a transfer belt passing the nip between the photoconductor drum and the transfer roller. The image is then transferred from the transfer belt to a recording medium such as paper. The image is fixed on the recording medium with a fixing device.

In these years, in order to meet the demand for higher image quality provided by image-forming apparatuses employing an electrophotographic system, supplies such as toners and photoconductor drums have been improved in terms of properties. However, even with such improvements in properties of supplies, occurrence of runout of photoconductor drums being rotated results in output images having blurring or density unevenness. Thus, higher image quality is not achieved.

The runout of a photoconductor drum is caused by bending or axial misalignment of the photoconductor drum. The bending of a photoconductor drum means that its drum body bends, the drum body having two ends fitted with flanges. The axial misalignment of a photoconductor drum means that misalignment occurs between the center of the outer circumferential surface and the rotational center of the photoconductor drum. The axial misalignment of a photoconductor drum can be caused by low dimensional accuracy of flanges attached to both ends of the drum body, or low dimensional accuracy of portions (fitted with flanges) of both ends of the drum body.

There are various methods for drivingly rotating a photoconductor drum; methods and members of transmitting a rotational driving force may also cause runout of a photoconductor drum. There is a commonly used mechanism of transmitting a driving force: a rotational driving force is transmitted via gears formed on the outer circumference of a flange, to thereby rotate the photoconductor drum. This mechanism is simple, but a plurality of gears are used to transmit a driving force; engagement between gears may cause "banding", and eccentricity due to supporting only one end may cause runout. There is another driving mechanism in which a rotational driving force is directly transmitted via a gear formed on the inner circumference of a flange and coupled with a driving member. In this mechanism, the gear is not formed on the outer circumferential surface, and the gear is rotated at the axial center, so that runout due to application of the force to one end is suppressed; however, the photoconductor drum is also supported only at one end, and hence runout due to eccentricity is not suppressed. There is still another driving mechanism in which a rotational driving force is transmitted via a penetration shaft coupled with a photoconductor drum. In this mechanism, the penetration shaft supports both ends of the photoconductor drum, to thereby suppress eccentric runout due to supporting only one end. This driving mechanism causes the least axial misalignment. However, in this mechanism, in order to transmit the driving force, parallel pins attached to the drive shaft are inserted into pin insertion holes of flanges. Thus, in this mechanism, depending on positional accuracy of the parallel pins and the pin insertion holes of the flanges, the rotational runout of the photoconductor drum may occur. In order to facilitate insertion and withdrawal of the drive shaft, gaps having a certain width are provided between the drive shaft and the flanges. Because of the gaps, backlash is caused, which may result in low runout accuracy.

Thus, studies have been performed on how to couple a penetration drive shaft with a flange of a photoconductor drum in order to suppress runout of a photoconductor drum due to axial misalignment of the photoconductor drum.

For example, Japanese Unexamined Patent Application Publication No. 2014-145467 discloses that protrusions are disposed in coupling grooves to thereby suppress backlash runout due to gaps.

SUMMARY

In the mechanism of using a penetration drive shaft to drive a drum, in order to prevent misalignment of the drum, it is the most important that the rotational central axis of the drum is aligned with the rotational central axis of the drive shaft.

In the above-described related art, backlash due to clearance for parallel pins can be suppressed and the drive shaft can be easily inserted and withdrawn. However, for expected insertion and withdrawal of the drive shaft, flanges have been provided such that a gap is formed between the inner circumference of a flange and the outer circumference of the drive shaft. In the related art, as a result of insertion of the drive shaft, pin insertion holes may have no gaps due to the presence of the protrusions, depending on the positions of insertion of the pins or positional accuracy of pin insertion holes of the flanges. Thus, the central axis of the photoconductor drum is deviated, so that the drum is rotated eccentrically; and the output images have density unevenness. Conversely, in the case of reducing the gap between the inner circumference of a flange and the outer circumference of the drive shaft, the drive shaft is less easily inserted or withdrawn, which results in degradation of the workability.

Accordingly, desirably provided are a photoconductor drum in which eccentricity is less likely to occur and a drive shaft is easily inserted and withdrawn; the drive shaft; a photoconductor drum system including the photoconductor drum and the drive shaft; and an image-forming apparatus and a multifunction apparatus that include the photoconductor drum system.

According to an aspect of the disclosure, there is provided a photoconductor drum including:

a drum body that is cylindrical; and a pair of flanges fitted to or near two axial ends of the drum body, wherein at least one of the flanges includes a plurality of engagement protrusions disposed on an inner circumferential surface of a through-hole for inserting a drive shaft for drivingly rotating the photoconductor drum, the through-hole having a larger radius than the drive shaft.

According to another aspect of the disclosure, there is provided a photoconductor drum system including:
the photoconductor drum; and
a drive shaft for drivingly rotating the photoconductor drum.

According to another aspect of the disclosure, there is provided a drive shaft including a plurality of engagement protrusions,
the drive shaft being insertable into a pair of through-holes in a pair of flanges of a photoconductor drum, the drive shaft having a smaller radius than each of the pair of through-holes, such that the plurality of engagement protrusions are in contact with inner circumferential surfaces of the pair of through-holes.

According to another aspect of the disclosure, there is provided a photoconductor drum system including:
the drive shaft; and
the photoconductor drum for being drivingly rotated by the drive shaft.

According to another aspect of the disclosure, there is provided an image-forming apparatus including the photoconductor drum system.

According to another aspect of the disclosure, there is provided a multifunction apparatus including the photoconductor drum system.

According to another aspect of the disclosure, there is provided a rotatable body including at least one flange including a plurality of engagement protrusions disposed on an inner circumferential surface of a through-hole for inserting a drive shaft for drivingly rotating the rotatable body, the through-hole having a larger radius than the drive shaft.

According to another aspect of the disclosure, there is provided a rotatable body system including:
the rotatable body; and
a drive shaft for drivingly rotating the rotatable body.

According to another aspect of the disclosure, there is provided a drive shaft including a plurality of engagement protrusions,
the drive shaft being insertable into at least one through-hole of at least one flange of a rotatable body, the drive shaft having a smaller radius than the at least one through-hole, such that the plurality of engagement protrusions are in contact with an inner circumferential surface of the at least one through-hole.

According to another aspect of the disclosure, there is provided a rotatable body system including:
the drive shaft; and
a rotatable body for being drivingly rotated by the drive shaft.

According to another aspect of the disclosure, there is provided a rotatable body system including:
a rotatable body including at least one flange; and
a drive shaft for drivingly rotating the rotatable body, the drive shaft being inserted into a through-hole of the at least one flange, the through-hole having a larger radius than the drive shaft,
wherein the at least one flange includes a plurality of engagement protrusions disposed between the through-hole and the drive shaft.

BRIEF DESCRIPTION OF THE DRAWINGS

FIG. 12 is a table summarizing conditions and evaluation items of Examples 1 to 5 and Comparative Examples 1 to 5.

DESCRIPTION OF THE EMBODIMENTS

Hereinafter, embodiments according to the present disclosure will be described in detail with reference to drawings.

First Embodiment

Hereinafter, an embodiment according to the present disclosure will be described in detail.

Figure 1:
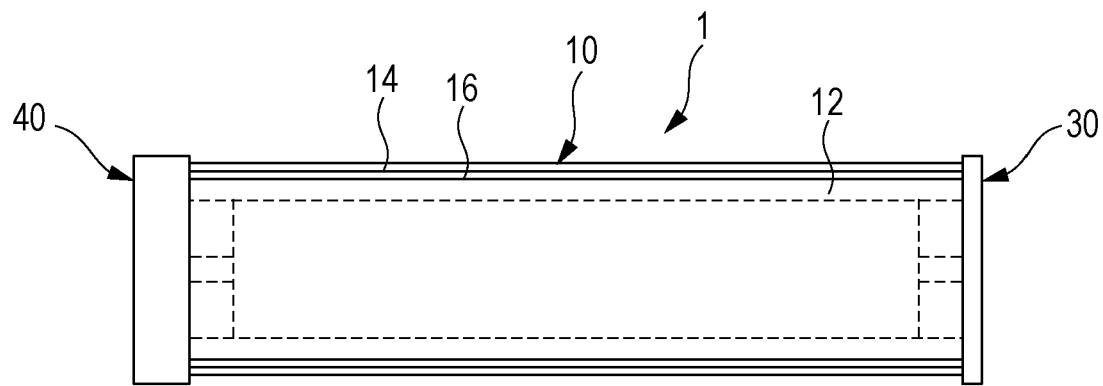
FIG. 1 is a schematic view of a photoconductor drum according to an embodiment of the present disclosure.

FIG. 1 is a schematic view of a photoconductor drum according to this embodiment.

Referring to FIG. 1, a photoconductor drum 1 includes a drum body 10, and a front flange (hereafter, referred to as "F flange") 30 and a rear flange (hereafter, referred to as "R flange") 40, which are fitted to the two ends of the drum body 10.

The drum body 10 includes a cylindrical electroconductive support 12, an intermediate layer (also referred to as "undercoating layer") 16 formed by coating the outer circumferential surface of the electroconductive support 12, and a photoconductive layer 14. The F flange 30 is a flange disposed on the front (F) side of an image-forming apparatus on which the photoconductor drum 1 is mounted. In this case, the R flange 40 is a flange disposed on the rear (R) side of the image-forming apparatus; on the rear side, the drive system of the image-forming apparatus is disposed. Hereafter, these flanges will be referred to as flanges 30 and 40 unless otherwise specified.

Electroconductive Support

The electroconductive support 12 is cylindrical. The electroconductive support 12 serves as an electrode of the photoconductor drum 1, and also functions as a support member for the intermediate layer (undercoating layer) 16, the photoconductive layer 14, and the like. The material for the electroconductive support 12 is not particularly limited as long as it is used in the present field. Specific examples of the material include metal and alloy materials such as aluminum, aluminum alloys, copper, brass, zinc, nickel, stainless steel, chromium, molybdenum, vanadium, indium, titanium, gold, and platinum; materials formed by laminating, with a metal foil, the surface of a base member formed of, for example, hard paper, glass, or a polymer material such as polyethylene terephthalate, polyamide, polyester, polyoxymethylene, polystyrene, cellulose, or poly(lactic acid); materials formed by vapor-depositing a metal material or an alloy material on the surface of the base member; and materials formed by performing vapor deposition or coating on the surface of the base member, to form a layer of an electroconductive compound such as an electroconductive polymer resin, tin oxide, indium oxide, or carbon black.

Figure 2:
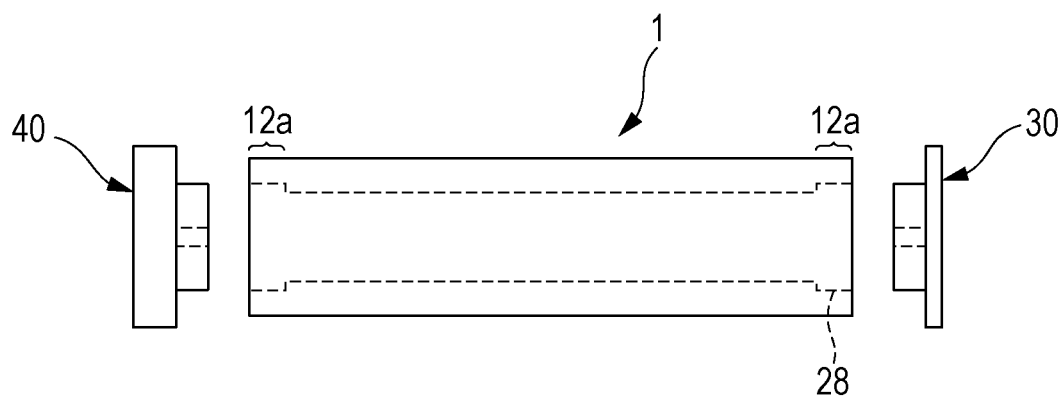
FIG. 2 is an exploded view of a photoconductor drum according to an embodiment of the present disclosure.

FIG. 2 illustrates an example in which the inner circumferential surfaces of both end portions of the electroconductive support 12, namely, fitting hole portions 12a to which the flanges 30 and 40 are fitted, are subjected to a cutting process referred to as a socket-and-spigot joint-forming process, to form processed surfaces 28. This cutting process is performed in order to enhance accuracy of fitting of the flanges 30 and 40. This enhances the inner-diametral dimensional accuracy of the fitting hole portions 12a.

Figure 3:
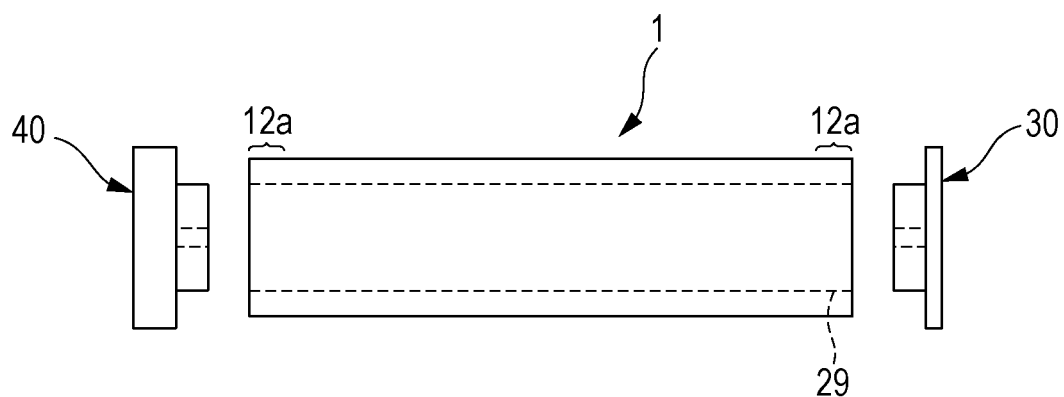
FIG. 3 is an exploded view of a photoconductor drum according to another embodiment of the present disclosure.

By contrast, FIG. 3 illustrates an example in which the fitting hole portions 12a of the electroconductive support 12 are not subjected to the cutting process and have an originally-formed inner circumferential surface 29. In this configuration provided without performing the cutting process, the diameter of the inner circumferential surface 29 is the inner diameters of the fitting hole portions 12a, and is the same as the inner diameter of a drawn pipe from which the electroconductive support 12 is produced.

The outer circumferential surface of the electroconductive support 12 may be subjected to, as needed, a diffuse-reflection treatment such as an anodic oxidation coating treatment, a surface treatment using a chemical, hot water, or the like, a coloring treatment, or a roughening treatment as long as the treatment does not affect the image quality.

The diffuse-reflection treatment is particularly effective when the photoconductor drum 1 is applied to an electrophotographic process using a laser as an exposure light source. Specifically, in the electrophotographic process using a laser as an exposure light source, laser beams are coherent; thus, a laser beam reflected by the outer surface of the photoconductor drum 1 may interfere with a laser beam reflected within the photoconductor drum 1; and the resultant interference fringes appear on images and cause image defects. For this reason, the surface of the electroconductive support 12 may be subjected to a diffuse-reflection treatment, to thereby prevent image defects due to interference between coherent laser beams.

Intermediate Layer

On the outer circumferential surface of the electroconductive support 12, the intermediate layer 16 and the photoconductive layer 14 are sequentially formed. The intermediate layer 16 has a function of preventing injection of charges from the electroconductive support 12 to the photoconductive layer 14 (a function of serving as a barrier against injection of holes). Specifically, the intermediate layer 16 suppresses degradation of the chargeability of the photoconductive layer 14, to suppress reduction in surface charges of non-exposure regions in which surface charges are not removed by exposure, so that image defects such as fogging are prevented. In particular, during image formation by reversal process, an image fogging is prevented that is referred to as black spots in which small black dots of toner are formed on the white background.

The intermediate layer 16 is formed on the electroconductive support 12 by applying a material for the intermediate layer 16. Instead of the intermediate layer 16, an alumite layer may be used that is formed by anodizing the surface of the electroconductive support 12.

The intermediate layer 16, which covers the surface of the electroconductive support 12, reduces the degree of irregularities that are surface defects of the electroconductive support 12 to provide a planarized surface. Thus, the intermediate layer 16 enhances the film formability of the photoconductive layer 14, and enhances the adhesion between the electroconductive support 12 and the photoconductive layer 14.

The photoconductor drum 1 having the intermediate layer 16 maintains predetermined electrical characteristics between the electroconductive support 12 and the photoconductive layer 14, and also prevents image defects due to defects of the electroconductive support.

When the intermediate layer 16 is formed as a resin monolayer, examples of its material include resin materials such as polyethylene, polypropylene, polystyrene, acrylic resin, vinyl chloride resin, vinyl acetate resin, polyurethane resin, epoxy resin, polyester resin, melamine resin, silicone resin, butyral resin, and polyamide resin, and copolymer resins including two or more repeating units of the foregoing. Other examples of the material for the intermediate layer 16 include casein, gelatin, polyvinylalcohol, and ethylcellulose. Of these, preferred are alcohol-soluble resins that are polyamide resin, butyral resin, and vinyl acetate resin, and more preferred is polyamide resin.

The reasons why polyamide resin is more preferred are, for example, as follows: polyamide resin serving as a binder resin forming the intermediate layer 16 does not dissolve or swell upon contact with a solvent used for forming the photoconductive layer 14 on the intermediate layer 16; the resin exhibits high adhesion to the electroconductive support 12 and has flexibility; and the resin has high compatibility with metal oxide contained in the intermediate layer 16, and provides high dispersibility of metal oxide particles and high storage stability of the dispersion liquid. Among such polyamide resins, alcohol-soluble nylon resin is suitably used.

Examples of the alcohol-soluble nylon resin include, what is called, copolymerized nylons obtained by copolymerizing, for example, 6-nylon, 6,6-nylon, 6,10-nylon, 11-nylon, or 12-nylon, and chemically modified nylons such as N-alkoxymethyl-modified nylon and N-alkoxyethyl-modified nylon.

In order for the intermediate layer 16 to maintain predetermined electrical characteristics and to prevent image defects due to defects of the electroconductive support 12 as described above, metal compound fine particles or an organic compound having an electron transport capability may be dispersed in, dissolved in, or added to the resin used for forming the intermediate layer 16, to thereby adjust the volume resistivity of the intermediate layer 16.

The metal compound fine particles are, for example, metal oxide fine particles formed of titanium oxide or zinc oxide. In particular, titanium oxide has an electron transport capability, and may be used for adjusting the volume resistivity of the intermediate layer 16, which is formed between the electroconductive support 12 and the photoconductive layer 14.

The titanium oxide may have a rutile crystalline form or an anatase crystalline form, or may be amorphous. The titanium oxide may be a mixture of two or more of the foregoing. The titanium oxide may generally have a particle form, may alternatively have an acicular form, a dendritic form, or a plate form.

The metal oxide fine particles may have an average primary particle size of 20 nm to 100 nm. When the average primary particle size is 20 nm or less, the particles may have lower dispersibility and may aggregate; this results in an increase in the viscosity, and the liquid does not have high stability. It is very difficult to apply such an intermediate-layer-forming coating liquid having increased viscosity to the electroconductive support 12, and the productivity is lower. When the average primary particle size is 100 nm or more, the chargeability of minute regions degrades during formation of the intermediate layer, and black spots tend to be formed.

The metal-compound-fine-particle content of the intermediate layer 16 may be 10 wt % to 99 wt %, preferably 30 wt % to 99 wt %, more preferably 35 wt % to 95 wt %. When the metal-compound-fine-particle content is less than 10 wt %, the sensitivity is reduced, and charges are accumulated in the intermediate layer 16, which results in an increase in the residual potential. This phenomenon noticeably occurs during repeated use at low temperature and at low humidity. When the metal-compound-fine-particle content is more than 99 wt %, aggregate tends to be generated in the intermediate layer 16, and image defects tend to occur.

The metal compound fine particles may be surface-treated with, for example, silicon dioxide or alumina; and, in order to enhance the compatibility of the metal compound fine particles with the intermediate-layer binder resin, the metal compound fine particles may be surface-treated with an organic compound, for example, a silane coupling agent such as an alkoxysilane compound, a silylating agent in which a halogen atom, a nitrogen atom, a sulfur atom, or another atom is bonded to a silicon atom, a titanate-based coupling agent, or an aluminum-based coupling agent.

The intermediate-layer-forming coating liquid may be dispersed with a dispersion-media-less ultrasonic dispersion device, or with a dispersion-media dispersion device such as a ball mill, a bead mill, or a paint conditioner. In particular, a dispersion device using dispersion media may be used: an inorganic compound is added to a solution of a binder resin in an organic solvent, and the inorganic compound is dispersed by a strong force applied via dispersion media by the dispersion device.

The material of the dispersion media may be glass, zircon, alumina, or titanium, or may be zirconia or titania, which have high wear resistance. The dispersion media may have any shape and any size: for example, a bead shape having a size of about 0.3 mm to several millimeters, or a ball shape having a size of several centimeters. When the dispersion media are formed of glass, the resultant dispersion liquid may have an increased viscosity and lower storage stability.

The intermediate layer 16, which is formed on the electroconductive support 12, preferably has a thickness of 0.05 to 10 µm, more preferably 0.1 to 5.0 µm. The reasons for this are as follows. When the intermediate layer 16 is formed so as to have a small thickness, the environmental characteristics are improved; however, the adhesion decreases between the electroconductive support 12 and the photoconductive layer 14, and image defects due to defects of the electroconductive support 12 occur. On the other hand, when the intermediate layer 16 is formed so as to have a large thickness, the sensitivity is degraded, and environmental characteristics are degraded. For these reasons, practical thicknesses are limited in order to reduce image defects and to enhance the stability of electrical characteristics.

The organic solvent used for the dispersion liquid for forming the intermediate layer 16 may be a commonly used organic solvent. When the binder resin is an alcohol-soluble nylon resin, the organic solvent may be a lower alcohol having 1 to 4 carbon atoms.

More specifically, the solvent of the intermediate-layer-forming coating liquid may be a lower alcohol selected from the group consisting of methyl alcohol, ethyl alcohol, isopropyl alcohol, n-propyl alcohol, n-butyl alcohol, isobutyl alcohol, and t-butyl alcohol.

The intermediate layer 16 is formed by, for example, applying, to an electroconductive support, an intermediate-layer-forming coating liquid prepared by dispersing the above-described polyamide resin and titanium oxide fine particles in the above-described lower alcohol, and drying the applied liquid.

Examples of the method of applying the intermediate-layer-forming coating liquid include, in the case of application to a sheet, a baker applicator method, a bar coater method (for example, a wire bar coater method), a casting method, a spin coating method, a roll method, a blade method, a bead method, and a curtain method; and, in the case of application to a drum, a spraying method, a vertical ring method, and a dip coating method.

Such an application method may be optimally selected in accordance with, for example, properties of the coating liquid and productivity. Preferred are the dip coating method, the blade coater method, and the spraying method. Among these coating methods, in particular, the dip coating method may be performed by dipping the electroconductive support in a coating bath filled with a coating liquid, and subsequently withdrawing the electroconductive support at a constant rate or a sequentially changing rate to form a layer on the surface of the electroconductive support; thus, the dip coating method is relatively simple, and advantageous in terms of productivity and costs, so that the dip coating method is suitably used for producing the photoconductor drum. A device used for the dip coating method may be equipped with a coating-liquid dispersion device represented by an ultrasonic generator in order to stabilize the dispersibility of the coating liquid.

Photoconductive Layer

The photoconductive layer 14, which is formed on the outer circumferential surface of the electroconductive support 12, namely on the intermediate layer 16, may be a photoconductive multilayer (photoconductive layer including layers having different functions) in which a charge generation layer and a charge transport layer are separately formed, or may be a photoconductive monolayer in which a charge generation layer and a charge transport layer are formed as a single layer. When the photoconductive layer 14 is a photoconductive multilayer, the photoconductor drum 1 is a multilayer photoconductor drum. When the photoconductive layer 14 is a photoconductive monolayer, the photoconductor drum 1 is a monolayer photoconductor drum.

Figure 4:
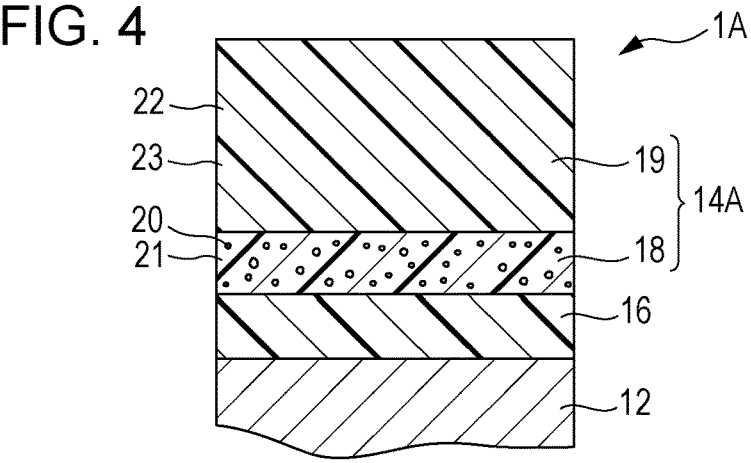
FIG. 4 is a sectional view of a portion of a photoconductor drum including a photoconductive multilayer.
Figure 5:
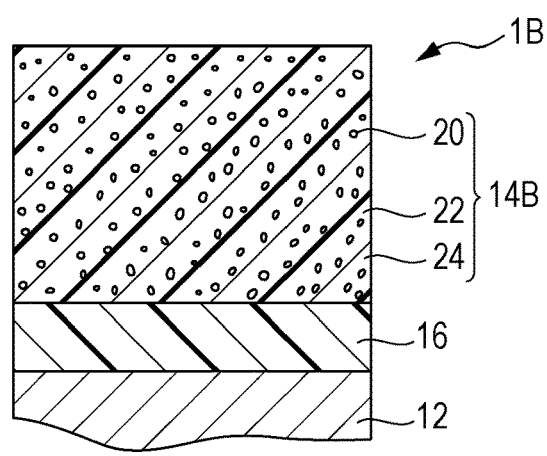
FIG. 5 is a sectional view of a portion of a photoconductor drum including a photoconductive monolayer.

FIGS. 4 and 5 illustrate examples of the configurations of the photoconductive multilayer and the photoconductive monolayer. FIG. 4 is a schematic sectional view illustrating the configuration of a portion of a multilayer photoconductor drum 1A in which, on the intermediate layer 16, a charge generation layer 18 and a charge transport layer 19 are stacked in this order. FIG. 4 illustrates, as an example, a photoconductive multilayer 14A in which, on the intermediate layer 16, the charge generation layer 18 and the charge transport layer 19 are formed in this order. Alternatively, the order of forming the charge generation layer 18 and the charge transport layer 19 may be reversed. However, these layers may be formed in the order illustrated in FIG. 4 to provide the photoconductive multilayer 14A.

The charge generation layer 18 contains a charge generation substance 20 and a binder resin 21. The charge transport layer 19 contains a charge transport substance 22 and a binder resin 23. When a charge generation function and a charge transport function are separately assigned to different layers, optimal materials for forming the layers can be independently selected.

FIG. 5 is a schematic sectional view illustrating the configuration of a portion of a monolayer photoconductor drum 1B including a photoconductive monolayer 14B on the intermediate layer 16. The photoconductive monolayer 14B contains a charge generation substance 20, a charge transport substance 22, and a binder resin 24.

Hereafter, the multilayer photoconductor drum 1A and the monolayer photoconductor drum 1B will be collectively referred to as the photoconductor drum 1 unless otherwise specified. Similarly, the photoconductive multilayer 14A and the photoconductive monolayer 14B will be collectively referred to as the photoconductive layer 14 unless otherwise specified.

Photoconductive Multilayer

Examples of the charge generation substance 20 contained in the charge generation layer 18 of the photoconductive multilayer 14A include bisazo compounds such as chloro diane blue, polycyclic quinone compounds such as dibromoanthanthrone, perylene compounds, quinacridone compounds, phthalocyanine compounds, and azulenium salt compounds. When a photoconductor drum is used to form images by reversal process using a light source such as a laser beam or an LED, the photoconductor drum is provided so as to have sensitivity in a long wavelength region of 620 nm to 800 nm.

As the charge generation material used in this case, phthalocyanine pigments and trisazo pigments, which have high sensitivity and high durability, have been studied. Of these, the phthalocyanine pigments have better characteristics, and these pigments may be used alone or in combination of two or more thereof.

Examples of the phthalocyanine pigments include metal-free phthalocyanine, metal phthalocyanine, mixtures of the foregoing, and mixed-crystal compounds of the foregoing. Examples of the metals of the metal phthalocyanine pigments include metals in zero oxidation state, halides of the metals such as chlorides and bromides, and oxides of the metals. Examples of the metals include Cu, Ni, Mg, Pb, V, Pd, Co, Nb, Al, Sn, Zn, Ca, In, Ga, Fe, Ge, Ti, and Cr. There are various proposed methods for producing such phthalocyanine pigments, and any production method may be used. Such a phthalocyanine pigment may be a phthalocyanine pigment prepared as a pigment and subsequently subjected to various purifications or dispersion treatment with various organic solvents for crystalline-form conversion.

Figure 6:
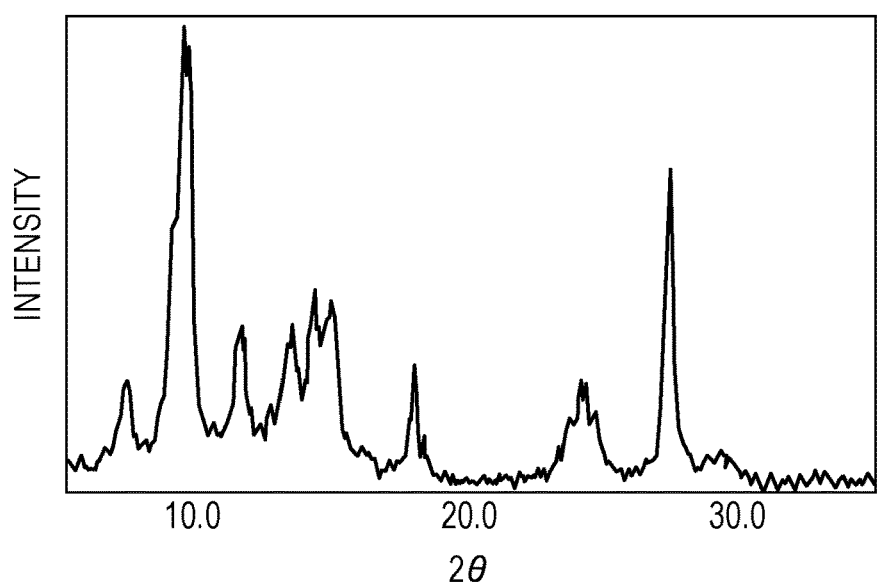
FIG. 6 illustrates an X-ray diffraction spectrum of crystalline titanyl phthalocyanine.

In this embodiment, as the charge generation substance, phthalocyanine is used. The phthalocyanine may be T-form metal-free phthalocyanine; or crystalline titanyl phthalocyanine having the maximum diffraction peak at a Bragg angle ($2\theta \pm 0.2°$) of 27.3° in an X-ray diffraction spectrum; or crystalline titanyl phthalocyanine having at least in an X-ray diffraction spectrum, as illustrated in FIG. 6, diffraction peaks at Bragg angles ($2\theta \pm 0.2°$) of 7.3°, 9.4°, 9.7°, and 27.3°, the diffraction peaks at 9.4° and 9.7° being higher than the diffraction peak at 27.3° and being well separated from each other, and the peak at 9.4° being the maximum diffraction peak.

Use of such a crystalline titanyl phthalocyanine having a specific X-ray diffraction peak enables, even in long-term use, high sensitivity and excellent electrical characteristics in any environments ranging from high-temperature high-humidity environments to low-temperature low-humidity environments.

The titanyl phthalocyanine has a basic structure represented by the following general formula (I):

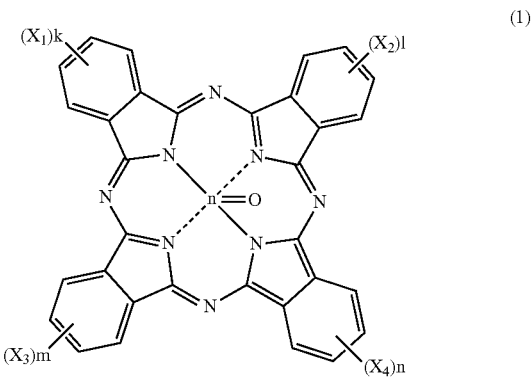

(1)

In this formula, $X_1$ to $X_4$ represent a halogen atom or a $C_1$ to $C_4$ alkyl or alkoxy group; and k, l, m, and n represent an integer of 0 to 4.

The halogen atom is a fluorine, chlorine, bromine, or iodine atom. The $C_1$ to $C_4$ alkyl group is a methyl, ethyl, n-propyl, isopropyl, n-butyl, isobutyl, or t-butyl group. The $C_1$ to $C_4$ alkoxy group is a methoxy, ethoxy, n-propoxy, isopropoxy, n-butoxy, isobutoxy, or t-butoxy group. The titanyl phthalocyanine can be synthesized by any method, for example, known methods described in Moser and Thomas "Phthalocyanine Compounds", Reinhold Publishing Corp., New York, 1963. For example, o-phthalodinitrile and titanium tetrachloride may be heated and melted, or heated in the presence of an organic solvent such as α-chloronaphthalene, to thereby obtain dichlorotitanium phthalocyanine at high yield. This dichlorotitanium phthalocyanine may be hydrolyzed with a base or water, to obtain titanyl phthalocyanine. This titanyl phthalocyanine may contain a phthalocyanine derivative in which hydrogen atoms of benzene rings are substituted by substituents such as chlorine, fluorine, a nitro group, a cyano group, or a sulfo group. Such a titanyl phthalocyanine composition is treated with a water-immiscible organic solvent such as dichloroethane in the presence of water, to thereby obtain the above-described crystalline form.

Non-limiting examples of the method of treating titanyl phthalocyanine with a water-immiscible organic solvent in the presence of water include a method of making titanyl phthalocyanine swell with water, and treating the titanyl phthalocyanine with an organic solvent; and a method of, without performing the swelling treatment, adding water to an organic solvent, and adding, to the resultant mixture, titanyl phthalocyanine powder.

Non-limiting examples of the method of making titanyl phthalocyanine swell with water include a method in which titanyl phthalocyanine is dissolved in sulfuric acid, and precipitated in water to obtain wet paste titanyl phthalocyanine; and a method in which a stirring-dispersing device such as a homomixer, a paint mixer, a ball mill, or a sand mill is used to make titanyl phthalocyanine swell with water to obtain wet paste titanyl phthalocyanine.

Alternatively, the titanyl phthalocyanine composition obtained by hydrolysis may be stirred for a sufficiently long time, or milled by application of mechanical stress, to obtain the above-described crystalline form.

Examples of a device used for this treatment include commonly used stirring devices, a homomixer, a paint mixer, a disperser, an ajiter, a ball mill, a sand mill, an attritor, and an ultrasonic dispersion device. The titanyl phthalocyanine having been treated is filtered, rinsed with, for example, methanol, ethanol, or water, and isolated.

The titanyl phthalocyanine obtained in this way exhibits excellent characteristics as the charge generation material of the photoconductor drum 1A. In this embodiment, the titanyl phthalocyanine may be used in combination with another charge generation material. Examples of such other charge generation materials include $\alpha$, $\beta$, Y, or amorphous titanyl phthalocyanines different in crystalline form from the above-described titanyl phthalocyanine, other phthalocyanines, azo pigments, anthraquinone pigments, perylene pigments, polycyclic quinone pigments, and squarylium pigments.

The method of using such a phthalocyanine pigment to form the charge generation layer 18 may be a method of performing vacuum deposition of the charge generation substance 20, in particular, the phthalocyanine pigment to form the charge generation layer 18; or a method of subjecting the phthalocyanine pigment, the binder resin 21, and an organic solvent to mixing-dispersing treatment, and using the resultant dispersion to form the charge generation layer 18. Before the mixing-dispersing treatment, pulverization treatment using a pulverization device may be performed. Examples of the pulverization device include a ball mill, a sand mill, an attritor, a vibration mill, and an ultrasonic dispersion device.

In general, the phthalocyanine pigment may be dispersed in a binder resin solution, and the resultant dispersion may be applied. Examples of the method of applying the dispersion include a spraying method, a bar coating method, a roll coating method, a blade coating method, a ring method, and a dip coating method. As in the formation of the intermediate layer 16, the dip coating method may be suitably used in the formation of the charge generation layer 18.

Examples of the binder resin 21 used for the charge-generation-layer-forming coating liquid include insulating resins such as melamine resin, epoxy resin, silicone resin, polyurethane resin, acrylic resin, polycarbonate resin, polyarylate resin, phenoxy resin, butyral resin, and copolymer resins including two or more repeating units, for example, vinyl chloride-vinyl acetate copolymer resin and acrylonitrile-styrene copolymer resin. However, the binder resin 21 is not limited to these examples, and any commonly used resins may be used alone or in combination of two or more thereof.

Examples of the solvent in which such a resin is dissolved include halogenated hydrocarbons such as methylene chloride and dichloroethane; ketones such as acetone, methyl ethyl ketone, and cyclohexanone; esters such as ethyl acetate and butyl acetate; ethers such as tetrahydrofuran and dioxane; aromatic hydrocarbons such as benzene, toluene, and xylene; aprotic polar solvents such as N,N-dimethylformamide, and N,N-dimethylacetamide; and solvent mixtures of the foregoing. From the viewpoint of environmental friendliness, which has been attracting attention, use of halogenated hydrocarbons may be avoided.

The mixing ratio of the phthalocyanine pigment to the binder resin may be in a range of 10 wt % to 99 wt %. When the mixing ratio is less than the range, the sensitivity degrades. When the mixing ratio is more than the range, the durability degrades and the dispersibility degrades, which causes an increase in the number of coarse particles. This results in image defects, in particular, a larger number of black spots.

During production of the charge-generation-layer-forming coating liquid, the above-described phthalocyanine pigment, the binder resin 21, and the organic solvent are mixed to achieve dispersion. In this case, dispersion conditions are appropriately selected so as not to cause entry of impurities due to, for example, abrasion of the vessel and dispersion media being used. This dispersion may be performed until, in the resultant dispersion liquid, the diameter of primary particles of the phthalocyanine pigment and/or aggregate particles of the primary particles becomes 3 μm or less. When the diameter of the primary particles and/or their aggregate particles is more than 3 μm, reversal process using the resultant photoconductor drum causes a large number of black spots on the white background. For this reason, during production of the charge-generation-layer-forming coating liquid using dispersing devices, the dispersion conditions may be optimized such that the resultant phthalocyanine pigment particles preferably have a diameter of 3 μm or less, more preferably a median diameter of 0.5 μm or less, a mode diameter of 3 μm or less, and larger particles not satisfying these ranges are not contained. Phthalocyanine pigment particles are turned into fine particles under relatively strong dispersion conditions and for long dispersion time because of the chemical structure. Further dispersion is ineffective in terms of costs, and unavoidably causes entry of impurities due to abrasion of dispersion media, for example. In addition, further dispersion causes transformation of the crystalline form of the phthalocyanine pigment particles due to, for example, the organic solvent, heat, and impact applied during dispersion, so that the sensitivity of the photoconductor drum considerably degrades. For this reason, dispersion may be performed such that the resultant phthalocyanine pigment particles do not have a median diameter of 0.01 μm or less or a mode diameter of 0.1 μm or less.

When the coating liquid having been subjected to dispersion contains several phthalocyanine pigment particles having a particle size of more than 3 µm, the coating liquid may be subjected to filtration treatment to remove primary particles and/or aggregate particles having a particle size of more than 3 µm. The material of a filter used for the filtration treatment may be a commonly used material as long as it does not swell or dissolve in an organic solvent used during the dispersion. The filter may be a TEFLON (registered trademark) membrane filter having pores of the same size. The coating liquid may be further centrifuged to remove coarse particles and aggregates.

The charge-generation-layer-forming coating liquid obtained in this way is applied such that the resultant charge generation layer 18 preferably has a thickness of 0.05 µm to 5 µm, more preferably 0.08 µm to 1 µm. When the charge generation layer 18 has a thickness smaller than such a range, the sensitivity degrades, and dispersion of the phthalocyanine pigment performed so as to have a very small particle size causes transformation of the crystalline form. When the charge generation layer 18 has a thickness larger than such a range, a sufficiently high sensitivity is provided, but the process is ineffective in terms of costs, and uniform application of the coating liquid is difficult to perform.

The charge transport layer 19 formed on the charge generation layer 18 may be formed by, in general, preparing a charge-transport-layer-forming coating liquid in which a charge transport substance 22 is dissolved in a binder resin solution, and applying this coating liquid to form the layer.

Examples of the charge transport substance 22 contained in the charge transport layer 19 include known compounds such as hydrazone compounds, pyrazoline compounds, triphenylamine compounds, triphenylmethane compounds, stilbene compounds, and oxadiazole compounds. These compounds may be used alone or in combination of two or more thereof.

As the binder resin, the above-described resins for the charge generation layer 18 may be used alone or in combination of two or more thereof. The charge transport layer 19 may be formed by the same method as in the intermediate layer 16.

The charge transport layer 19 preferably has a thickness of 5 µm or more and 50 µm or less, more preferably 10 µm or more and 40 µm or less.

Photoconductive Monolayer

The photoconductive monolayer 14B contains, as main components, the charge generation substance 20, the charge transport substance 22, and the binder resin 24. The photoconductive monolayer 14B may contain appropriate amounts of additives as in the charge generation layer 18.

The photoconductive monolayer 14B can be formed in the following manner: the charge generation substance 20, the charge transport substance 22, and other additives as needed are dissolved and/or dispersed in an appropriate organic solvent to prepare a photoconductive-monolayer-forming coating liquid; this coating liquid is applied to the surface of the intermediate layer 16 on the electroconductive support 12, and subsequently dried to remove the organic solvent. The other steps and other conditions are the same as in the formation of the charge generation layer 18 and the charge transport layer 19.

The photoconductive monolayer 14B is not particularly limited in terms of thickness, and preferably has a thickness of 5 to 50 µm, particularly preferably 10 to 40 µm. When the photoconductive monolayer 14B has a thickness of less than 5 µm, the surface of the monolayer photoconductor drum 1B may have a degraded charge retention capability. When the photoconductive monolayer 14B has a thickness of more than 50 µm, the productivity may degrade.

For the purpose of, for example, increasing the sensitivity, a reduction in the residual potential, and a reduction in fatigue during repeated use, the photoconductive layer 14 may be formed so as to contain at least one electron-accepting substance. Examples of this substance include quinone compounds such as p-benzoquinone, chloranil, tetrachloro-1,2-benzoquinone, hydroquinone, 2,6-dimethylbenzoquinone, methyl-1,4-benzoquinone, α-naphthoquinone, and β-naphthoquinone; nitro compounds such as 2,4,7-trinitro-9-fluorenone, 1,3,6,8-tetranitrocarbazole, p-nitrobenzophenone, 2,4,5,7-tetranitro-9-fluorenone, and 2-nitrofluorenone; and cyano compounds such as tetracyanoethylene, 7,7,8,8-tetracyanoquinodimethane, 4-(P-nitrobenzoyloxy)-2',2'-dicyanovinylbenzene, and 4-(m-nitrobenzoyloxy)-2',2'-dicyanovinylbenzene.

Of these, in particular, the following may be used: fluorenone compounds, quinone compounds, and benzene derivatives having an electron-withdrawing substituent such as Cl, CN, or $NO_2$. The photoconductive layer 14 may be formed so as to contain an ultraviolet absorber or an antioxidant, such as benzoic acid, stilbene compounds and derivatives thereof, and nitrogen-containing compounds such as triazole compounds, imidazole compounds, oxadiazole compounds, thiazole compounds, and derivatives thereof.

The photoconductor drum 1 may include, on the surface of the photoconductive layer 14, a protective layer (not shown) for protecting the surface of the photoconductive layer. The protective layer has functions of improving the wear resistance of the photoconductive layer and preventing chemically detrimental effects caused by ozone, nitrogen oxide, and the like.

The protective layer may be formed from thermoplastic resin, photocurable resin, or thermosetting resin. The protective layer may be formed so as to contain, for example, inorganic materials such as an ultraviolet screening agent, an antioxidant, and metal oxide, an organometallic compound, and an electron-accepting substance. In order to enhance the wear resistance of the protective layer, fluororesin fine particles or metal oxide fine particles may be dispersed.

The protective layer can be formed, for example, in the following manner: in an appropriate organic solvent, a binder resin and, as needed, additives such as an antioxidant or an ultraviolet absorber are dissolved or dispersed to prepare a protective-layer-forming coating liquid; this protective-layer-forming coating liquid is applied to the surface of the photoconductive monolayer or the photoconductive multilayer, and dried to remove the organic solvent. The other steps and their conditions are the same as in the formation of the charge generation layer.

The protective layer is not particularly limited in terms of thickness, and preferably has a thickness of 0.5 to 10 µm, particularly preferably 1 to 5 µm. When the protective layer has a thickness of less than 0.5 µm, the photoconductor drum 1 may have a surface having lower scratch resistance and lower durability. Conversely, when the protective layer has a thickness of more than 10 µm, the photoconductor drum 1 may provide lower resolution.

The photoconductive layer 14 and the protective layer may be formed so as to contain, as needed, a plasticizer such as dibasic acid ester, fatty acid ester, phosphoric acid ester, phthalic acid ester, or chlorinated paraffin, to impart processibility and flexibility, to thereby improve the mechanical properties; and a leveling agent such as silicone resin may be used.

The photoconductor drum 1 is applicable to, for example, electrophotographic copiers, various printers using light sources such as lasers or light-emitting diodes (LEDs), and electrophotographic plate making systems. The photoconductor drum 1 is applicable to, in addition to the most commonly available photoconductor drums using organic materials as described above, photoconductor drums using inorganic materials such as amorphous silicon.

Incidentally, in both of the case of the monolayer structure and the case of the multilayer structure, the photoconductive layer 14 may be a negatively charged layer in order for the intermediate layer 16 to serve as a barrier against injection of holes from the electroconductive support 12, and in order to provide high sensitivity and high durability.

Flanges

In general, in production of flanges, cutting serves as a production method for achieving high dimensional accuracy, and enables production of flanges having a desired shape and high runout accuracy. However, cutting is not suitable for mass production and incurs high costs. Thus, in general, flanges are produced by molding using molds.

Figure 7A:
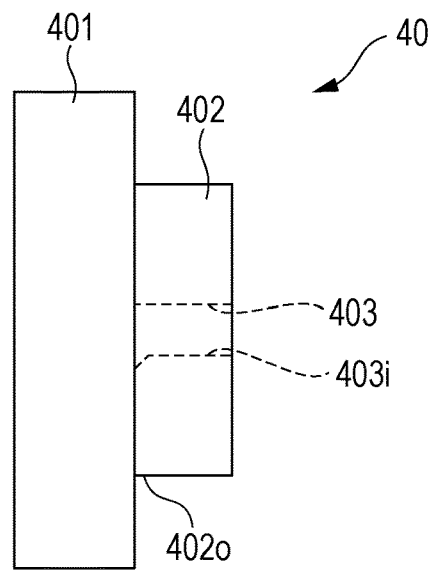
FIG. 7A is a side view illustrating the configuration of an R flange according to an embodiment of the present disclosure.
Figure 7B:
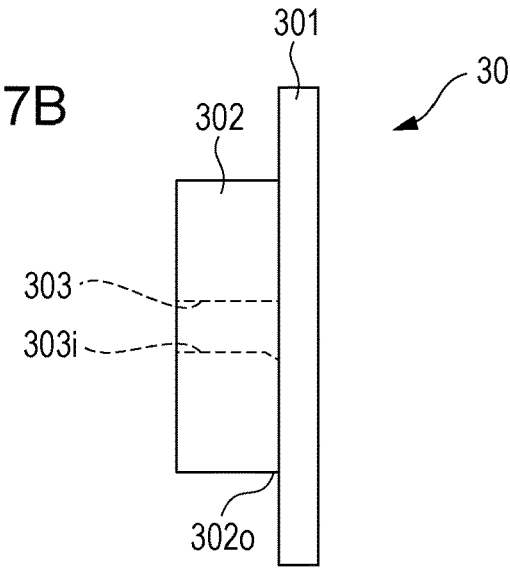
FIG. 7B is a side view illustrating the configuration of an F flange according to an embodiment of the present disclosure.
Figure 7C:
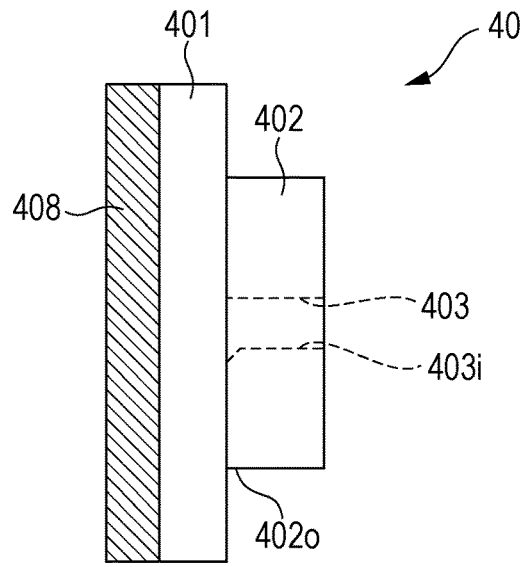
FIG. 7C is a side view illustrating the configuration of an R flange according to another embodiment of the present disclosure.

Referring to FIG. 7A to FIG. 7C, an F flange 30 includes a flange portion 301, a fitting protrusion portion 302, and a shaft support portion 303; and an R flange 40 includes a flange portion 401, a fitting protrusion portion 402, and a shaft support portion 403.

In the F flange 30, a fitting-protrusion-portion outside 302o, which is the outer circumferential portion of the fitting protrusion portion 302, is fitted to the inner circumferential portion of the drum body 10. In the F flange 30, a fitting-protrusion-portion inside 303i, which is the inner circumferential portion of the fitting protrusion portion 302, faces a drive shaft 50 with a gap therebetween.

Similarly, in the R flange 40, a fitting-protrusion-portion outside 402o, which is the outer circumferential portion of the fitting protrusion portion 402, is fitted to the inner circumferential portion of the drum body 10. In the R flange 40, a fitting-protrusion-portion inside 403i, which is the inner circumferential portion of the fitting protrusion portion 402, faces the drive shaft 50 with a gap therebetween.

Figure 8A:
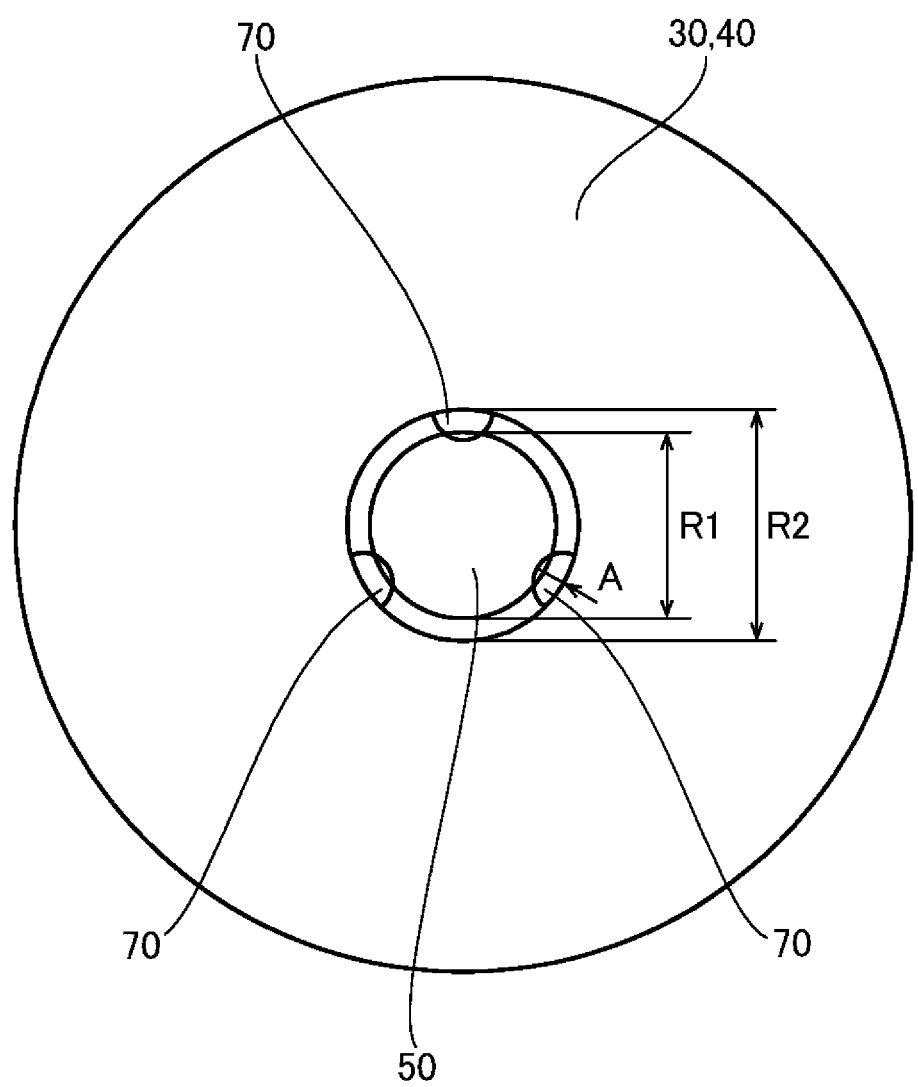
FIG. 8A is a sectional view of a flange and a drive shaft according to an embodiment of the present disclosure, taken along a plane perpendicular to the axis of the flange and the drive shaft.
Figure 8B:
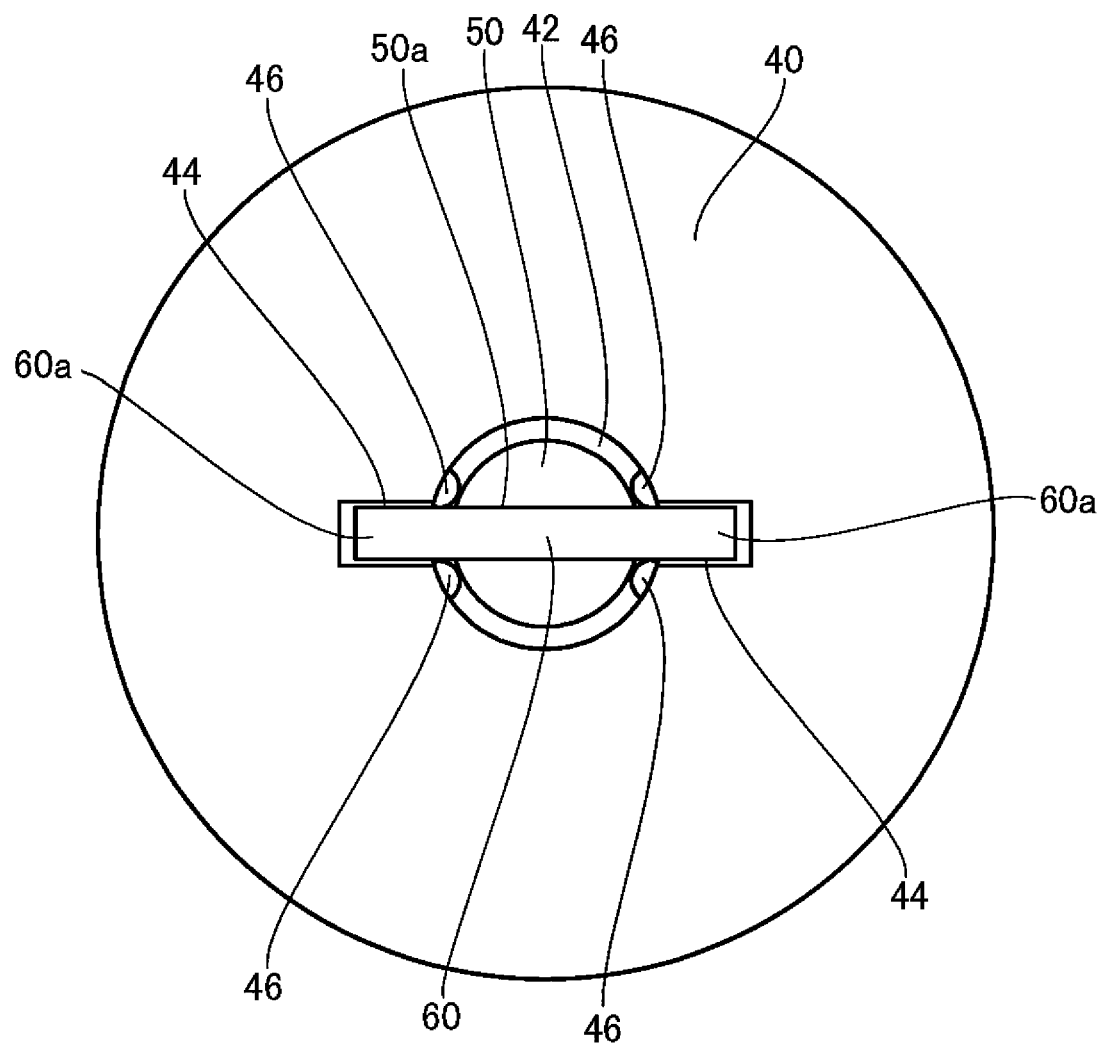
FIG. 8B is another sectional view of a flange and a drive shaft according to an embodiment of the present disclosure, taken along a plane perpendicular to the axis of the flange and the drive shaft.
Figure 9:
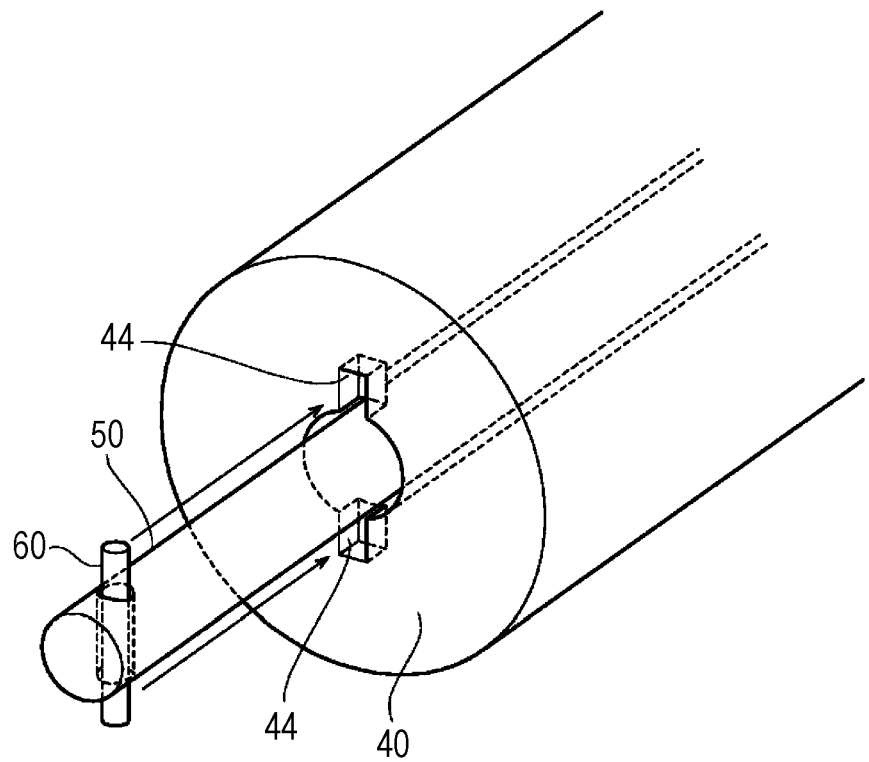
FIG. 9 is a perspective view of a flange and a drive shaft according to an embodiment of the present disclosure.

Referring to FIGS. 8B and 9, the R flange 40, which basically has a cylindrical shape, has a cylindrical through-hole 42, into which the drive shaft 50 can be inserted so as to extend through the through-hole 42. The flange 40 also has a pair of rectangular-hole groove portions 44, which interlock with end portions 60a of a parallel pin 60, which is inserted through a through-hole 50a such that the two ends protrude from the through-hole 50a, which extends in a diametral direction of the drive shaft 50. The rectangular-hole groove portions 44 function as pin insertion holes for the parallel pin 60. At positions circumferentially adjacent to the rectangular-hole groove portions 44, drive protrusions 46 are provided so as to extend, within the through-hole 42, from the surface of the flange 40 toward the central portion. The drive protrusions 46 are in contact with the parallel pin 60, so as to receive the driving force applied by the drive shaft 50 and the parallel pin 60.

Engagement protrusions 70 and the drive protrusions 46 on the inner circumferential surface of the through-hole of the flange can be formed by, for example, a method of forming holes in the mold so as to have the same size as the protrusions; a method of cutting regions around the protrusions in the finished flange; or a method of fusing the protrusions to the finished flange.

During formation of an electrostatic latent image on a photoconductor drum, as the photoconductor drum is rotated, the following distances vary: the distance between the surface of the photoconductor drum and an exposure device such as a laser beam for writing the electrostatic latent image, and the distance between the surface of the photoconductor drum and a development device. This may result in distribution unevenness of the electrostatic latent image written on the surface of the photoconductor drum, or distribution unevenness of a toner image.

For this reason, in order to provide high quality images at high resolution without blurring or density unevenness, the performance of supply products has been improved, such as high-sensitivity photoconductor drums and small-particle-size toners having good particle-size distributions.

However, as described above, when the flange fitted to the drum body has low molding accuracy, it is difficult to provide an apparatus for forming high-quality and high-grade images.

The photoconductor drum according to this embodiment has, on the inner circumferential surface of the through-hole of the flange, in addition to drive protrusions circumferentially adjacent to the pin insertion holes, engagement protrusions. Since the engagement protrusions are formed on the inner circumferential surface, as long as sufficiently high positional accuracy is achieved for the pin insertion holes of the flange and for the parallel pin, the central axis of the flange aligns with the central axis of the photoconductor drum, and the drive shaft is easily inserted into and withdrawn from the flange. In other words, the support protrusions are formed in the inner circumferential portion, so that the drive shaft comes into contact with, not the flange any longer, but these engagement protrusions. This enables a decrease in the resistance of insertion and withdrawal of the drive shaft. In addition, the engagement protrusions supporting the drive shaft define the relative positional relationship between the drive shaft and the flange such that the central axis of the drive shaft aligns with the central axis of the flange.

The engagement protrusions may be formed such that three or more and six or less engagement protrusions are arranged at equal intervals in the circumferential direction. The reasons for this are as follows. When less than three engagement protrusions are formed, the drive shaft may not be disposed at the center. From the viewpoint of positional accuracy, a certain number or more of engagement protrusions may be formed. However, the effect provided by increasing the number of engagement protrusions gradually decreases. When six or more engagement protrusions are formed, the engagement protrusions and the outer circumference of the drive shaft have an increased contact area therebetween. Thus, the drive shaft may not be easily inserted or withdrawn, and the workability may degrade.

In the direction in which the drive shaft is inserted, in addition to the trailing-end-side engagement protrusions, other engagement protrusions may also be formed on the leading-end side. This enables a further increase in the degree of alignment between the axis of the drive shaft and the axis of the flange.

In such a case where two or more rows of engagement protrusions are formed in the drive-shaft insertion direction, leading-end-side engagement protrusions may be larger than the trailing-end-side engagement protrusions. This facilitates insertion of the drive shaft into the flange; and the leading-end-side engagement protrusions enable an increase in the degree of alignment between the axis of the drive shaft and the axis of the flange.

The engagement protrusions may be formed at positions so as to partially correspond to the ribs of the flange. When such a rib includes an axial-direction portion disposed parallel to the longitudinal axis direction of the flange, such an engagement protrusion may be formed at a position so as to correspond to, in the circumferential direction of the flange, the axial-direction portion of the rib. This prevents, during insertion of the drive shaft, the engagement protrusions from sinking into the flange, which enables an increase in the degree of alignment between the axis of the drive shaft and the axis of the flange.

Alternatively, a plurality of engagement protrusions may be interspersed along a helical curve drawn on the inner circumferential surface of the flange so as to extend in the axial direction of the drive shaft. This facilitates insertion of the drive shaft into the flange, and enables an increase in the degree of alignment between the central axis of the drive shaft and the central axis of the flange.

In order to easily insert the drive shaft into the flange having engagement protrusions on the inner circumferential surface, as illustrated in FIG. 8A, the following configuration may be employed: an inner diameter R2 of the flange is larger than an outer diameter R1 of the drive shaft, and a height A of the engagement protrusions is equal to or larger than the constant gap distance (R2−R1)/2 between the inner circumferential surface of the flange and the outer circumferential surface of the drive shaft. These relationships are represented by the following expressions.

$$R2-R1>0$$

$$(R2-R1)/2 \leq A$$

Incidentally, such a configuration may be applied only to the rear-side flange 40 having the driving-force transmission portion and the corresponding portion of the drive shaft 50; alternatively, the configuration may be applied to the rear-side flange 40, the front-side flange 30, the corresponding portions of the drive shaft 50. In the latter case, on each of both end portions of the photoconductor drum, the axis of the flange aligns with the axis of the drive shaft. This enables further suppression of runout of the whole photoconductor drum.

The drive shaft is received by a shaft support portion of the flange, and the engagement protrusions are formed at the shaft support portion. The inner diameter R2 or the radius R2/2 of the shaft support portion, dimensions (such as A) of portions of the engagement protrusions, and the position ((R2−2·A)/2) of the tip of an engagement protrusion formed at the shaft support portion of the flange can be measured with measurement instruments such as a laser displacement meter or a roundness/cylindricality measurement instrument.

The flange 30 may be formed from a material selected from thermoplastic resins commonly used for molding using molds. Examples of the material include polycarbonate copolymer resins including polycarbonate resin and various bisphenol derivatives as components, polymer alloy materials formed from polycarbonate resin and various materials such as ABS resin, polystyrene, polyester resin, or poly (lactic acid), and reinforced resin materials filled with filler that is fine particles of an inorganic substance such as glass.

Incidentally, the engagement protrusions may have the shape of a cylinder, a cone, a truncated cone, a polygonal column, a polygonal pyramid, a truncated polygonal pyramid, or a plate, or may have another shape.

The engagement protrusions may have a height of about 10 microns, and may be constituted by an elastic member containing resin, an elastic resin member, or a metal having lower hardness than the drive shaft.

The engagement protrusions may all or partially be formed, not on the flange, but on the drive shaft.

In this embodiment, runout of the photoconductor drum due to the flange is effectively suppressed at lower costs. Mounting of such a photoconductor drum having the flange provides inexpensively an image-forming apparatus that provides high-resolution output images with less blurring.

Image-Forming Apparatus

The image-forming apparatus according to this embodiment is configured to use a photoconductor drum according to an embodiment of the present disclosure to form, by an electrophotographic process, on recording media such as paper, toner images in accordance with image data. Hereinafter, the image-forming apparatus according to an embodiment will be described with reference to a drawing; however, the following descriptions are not intended to be limiting.

Figure 10:
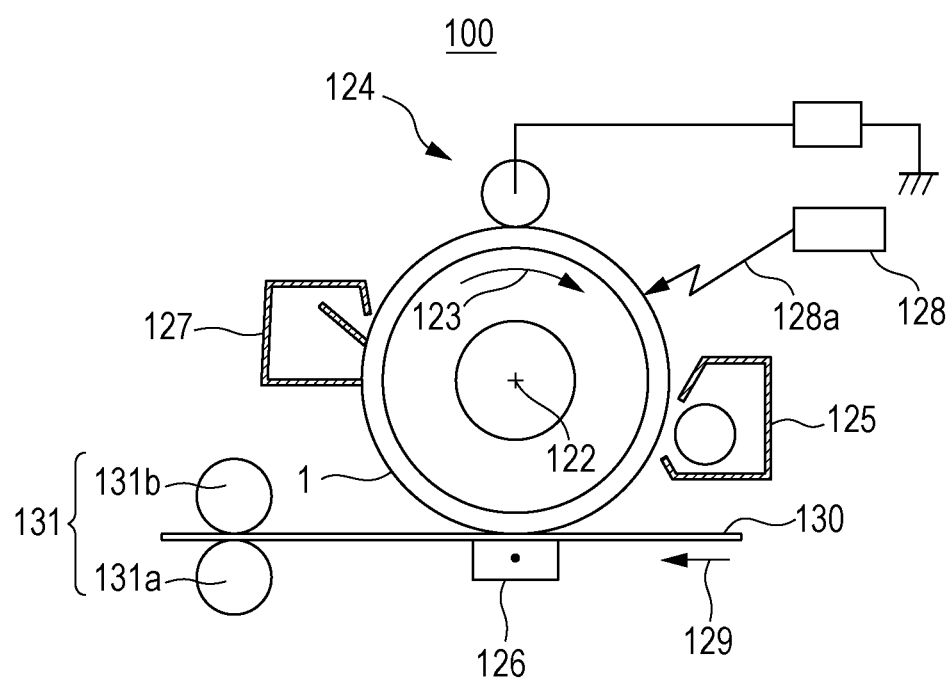
FIG. 10 is a schematic view illustrating an example of the configuration of an image-forming apparatus according to an embodiment of the present disclosure.

FIG. 10 is a schematic side view illustrating the configuration of the image-forming apparatus according to this embodiment. Referring to FIG. 10, an image-forming apparatus 100 includes the photoconductor drum 1 according to an embodiment of the present disclosure, a charger 124, an exposure device 128, a development device 125, a transfer device 126, a cleaner 127, a fixing device 131, and a discharger (not shown). Transfer paper 130 is fed to the image-forming apparatus 100.

The photoconductor drum 1 is rotatably supported by the body (not shown) of the image-forming apparatus 100, and is drivingly rotated by a driving unit (not shown) around a rotational axis 122 and in a direction indicated by arrow 123. The driving unit includes, for example, an electric motor and a reduction gear; the driving force of the driving unit is transmitted to the electroconductive support constituting the core member of the photoconductor drum 1, to thereby drivingly rotate the photoconductor drum 1 at a predetermined circumferential speed. The charger 124, the exposure device 128, the development device 125, the transfer device 126, and the cleaner 127 are disposed, in this order, from upstream to downstream in the rotational direction of the photoconductor drum 1 indicated by the arrow 123, along the outer circumferential surface of the photoconductor drum 1.

The charger 124 is a charging unit configured to charge the outer circumferential surface of the photoconductor drum 1 to a predetermined potential. The exposure device 128 includes a light source, such as a semiconductor laser, and is configured to apply a laser beam 128a output from the light source, to the charged outer circumferential surface of the photoconductor drum 1, to thereby perform exposure in accordance with the image data. The development device 125 is configured to develop, with a developer, the electrostatic latent image formed by exposure on the surface of the photoconductor drum 1, to thereby form a toner image, which is a visible image.

The transfer device 126 is configured to transfer the toner image onto a recording medium, the transfer paper 130, which is fed by a transport unit (not shown) in a direction indicated by arrow 129 to the nip between the photoconductor drum 1 and the transfer device 126. The cleaner 127 is configured to remove and collect residual toner on the outer circumferential surface of the photoconductor drum 1 after the transfer process performed by the transfer device 126. The image-forming apparatus 100 further includes the fixing device 131 configured to fix the transferred image in a downstream region to which the transfer paper 130 having passed the nip between the photoconductor drum 1 and the transfer device 126 is transported. The fixing device 131 includes a heating roller 131a and a pressure roller 131b.

Image-forming processes using the image-forming apparatus 100 are performed in the following manner. The photoconductor drum 1 is first drivingly rotated by the driving unit in the direction indicated by the arrow 123, and the surface of the photoconductor drum 1 is uniformly charged to a predetermined positive or negative potential by the charger 124. Subsequently, the beam 128a is applied in accordance with the image data from the exposure device 128 to the surface of the photoconductor drum 1. This exposure forms an electrostatic latent image on the surface of the photoconductor drum 1.

Subsequently, the development device 125 supplies toner to the surface of the photoconductor drum 1 having the electrostatic latent image thereon, to develop the electrostatic latent image. Thus, a toner image is formed.

In synchronization with the exposure performed on the photoconductor drum 1, the transfer paper 130 is fed to the nip between the photoconductor drum 1 and the transfer device 126. The transfer device 126 transfers, onto the fed transfer paper 130, the toner image formed on the surface of the photoconductor drum 1.

Subsequently, the transfer paper 130 onto which the toner image has been transferred is transported by the transport unit to the fixing device 131. The transfer paper 130 is heated and pressed while passing through the nip between the heating roller 131a and the pressure roller 131b of the fixing device 131, so that the toner image is fixed on the transfer paper 130 and turned into a durable image. The transfer paper 130 on which the image has been formed is ejected by the transport unit to the outside of the image-forming apparatus 100.

Residual toner on the surface of the photoconductor drum 1 after the transfer of the toner image by the transfer device 126 is separated and collected, by the cleaner 127, from the surface of the photoconductor drum 1. The charges of the surface of the photoconductor drum 1 are eliminated by a beam from a discharging lamp, so that the electrostatic latent image disappears. The photoconductor drum 1 is further drivingly rotated, and the series of processes starting from charging are repeated to thereby continuously form images.

EXAMPLES

Example 1

Figure 11A:
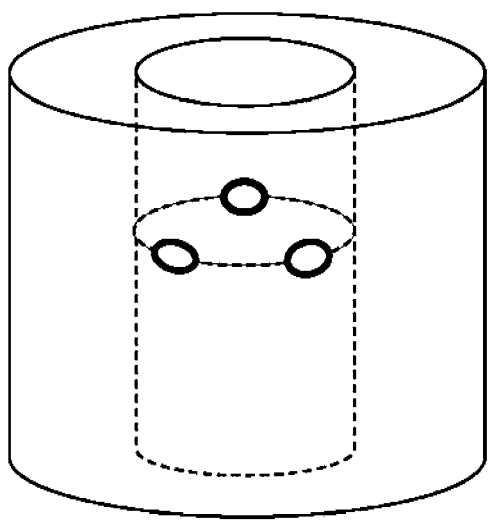
FIG. 11A is a perspective view of a shaft support portion of a flange according to Example 1 of the present disclosure.

In Example 1, the shaft support portion of a flange is adjusted in terms of the diameter of the inner circumferential surface of the shaft support portion such that the inner circumferential surface of the shaft support portion and the outer circumferential surface of the drive shaft have a gap of 20 microns therebetween. As illustrated in FIG. 11A and Table in FIG. 12, three engagement protrusions having a height of 40 microns are arranged at equal angles in the circumferential direction on the inner circumferential surface.

Example 2

Figure 11B:
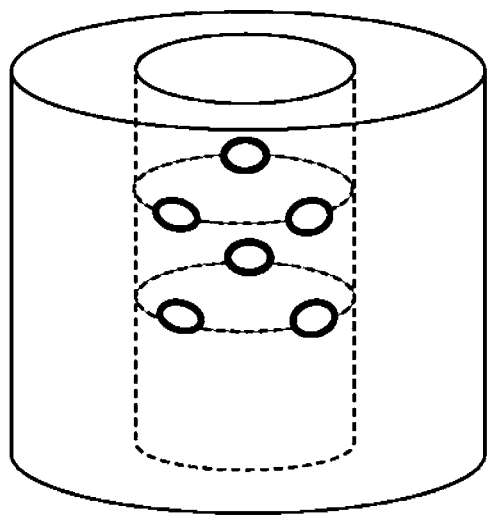
FIG. 11B is a perspective view of a shaft support portion of a flange according to Example 2 of the present disclosure.

As in Example 1, the shaft support portion of the flange in Example 2 is adjusted in terms of the diameter of the inner circumferential surface of the shaft support portion such that the inner circumferential surface of the shaft support portion and the outer circumferential surface of the drive shaft have a gap of 20 microns therebetween. As illustrated in FIG. 11B and Table in FIG. 12, two groups of engagement protrusions are arranged in the axial direction, the engagement protrusions being the same as those formed in the shaft support portion in Example 1 and having a height of 40 microns.

Example 3

Figure 11C:
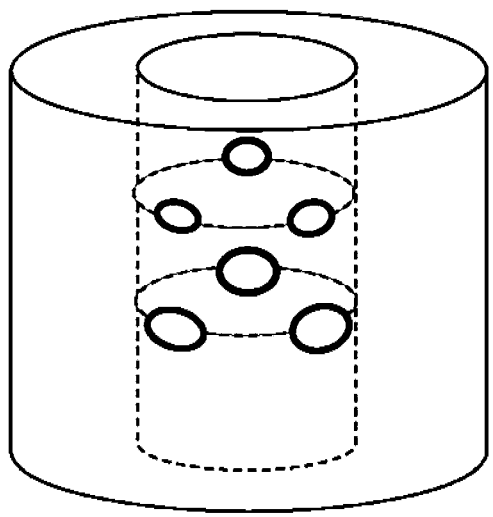
FIG. 11C is a perspective view of a shaft support portion of a flange according to Example 3 of the present disclosure.

As in Example 1, the shaft support portion of the flange in Example 3 is adjusted in terms of the diameter of the inner circumferential surface of the shaft support portion such that the inner circumferential surface of the shaft support portion and the outer circumferential surface of the drive shaft have a gap of 20 microns therebetween. As illustrated in FIG. 11C and Table in FIG. 12, two groups of engagement protrusions are arranged in the axial direction as in Example 2. In Example 2, the engagement protrusions of the two groups have a height of 40 microns. By contrast, in Example 3, for the drive shaft being inserted into the photoconductor drum, engagement protrusions of one group on the trailing-end side of the drive shaft have a height of 40 microns, whereas engagement protrusions of the other group on the leading-end side have a height of 50 microns. In other words, the engagement protrusions of the leading-end-side group are higher than the engagement protrusions of the trailing-end-side group.

Example 4

Figure 11D:
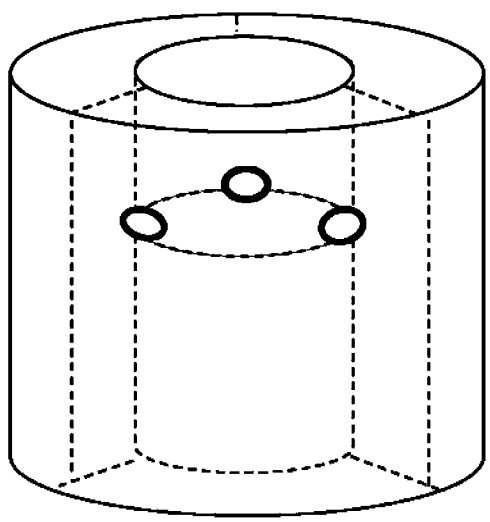
FIG. 11D is a perspective view of a shaft support portion of a flange according to Example 4 of the present disclosure.

As in Example 1, the shaft support portion of the flange in Example 4 is adjusted in terms of the diameter of the inner circumferential surface of the shaft support portion such that the inner circumferential surface of the shaft support portion and the outer circumferential surface of the drive shaft have a gap of 20 microns therebetween. As illustrated in FIG. 11D and Table in FIG. 12, three engagement protrusions are disposed so as to overlap three plate-shaped ribs radially extending in the shaft support portion of the flange. This configuration is a modification of that of Example 1. Similarly, the configurations of Example 2 and Example 3 can be modified.

Example 5

Figure 11E:
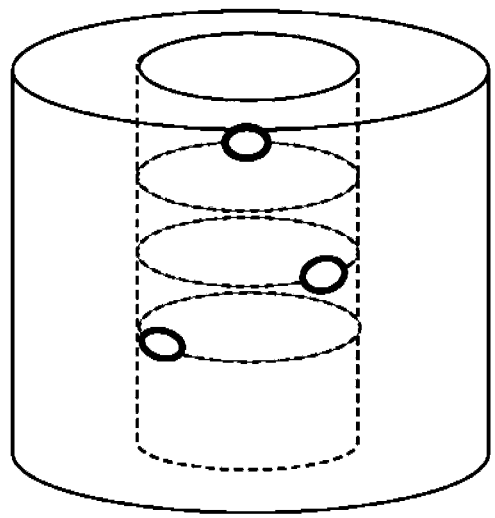
FIG. 11E is a perspective view of a shaft support portion of a flange according to Example 5 of the present disclosure.

As in Example 1, the shaft support portion of the flange in Example 5 is adjusted in terms of the diameter of the inner circumferential surface of the shaft support portion such that the inner circumferential surface of the shaft support portion and the outer circumferential surface of the drive shaft have a gap of 20 microns therebetween. As illustrated in FIG. 11E and Table in FIG. 12, three engagement protrusions are interspersed, on the inner circumferential surface of the shaft support portion of the flange, along a helical line extending in the axial direction.

Comparative Example 1

Figure 11F:
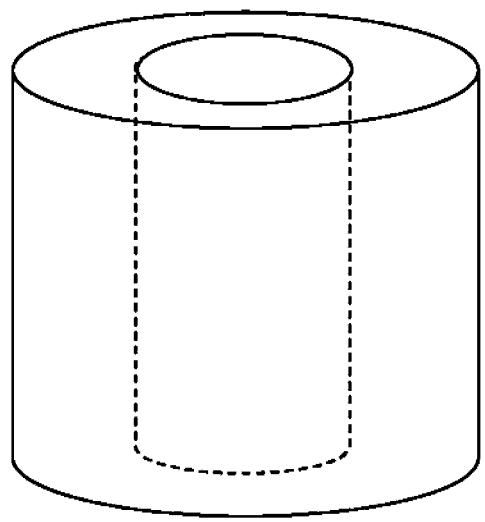
FIG. 11F is a perspective view of a shaft support portion of a flange according to Comparative Example 1.

As in Example 1, the shaft support portion of the flange in Comparative Example 1 is adjusted in terms of the diameter of the inner circumferential surface of the shaft support portion such that the inner circumferential surface of the shaft support portion and the outer circumferential surface of the drive shaft have a gap of 20 microns therebetween. As illustrated in FIG. 11F and Table in FIG. 12, no engagement protrusions are disposed. Specifically, this configuration is provided by removing the engagement protrusions in Example 1. In this configuration, the inner circumferential surface of the shaft support portion of the flange and the outer circumferential surface of the drive shaft have a gap therebetween.

Comparative Example 2

Figure 11G:
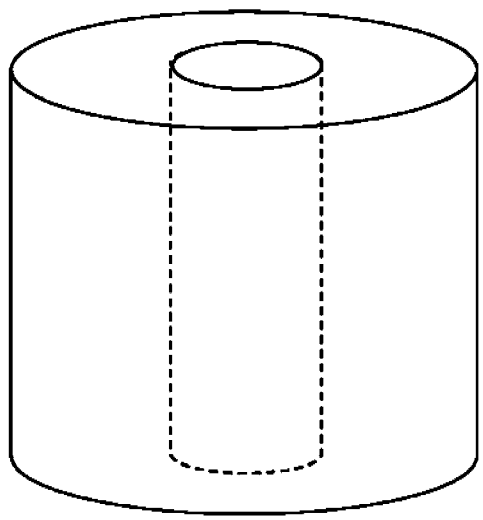
FIG. 11G is a perspective view of a shaft support portion of a flange according to Comparative Example 2.

Unlike Example 1 and Comparative Example 1, the shaft support portion of the flange in Comparative Example 2 is adjusted in terms of the diameter of the inner circumferential surface of the shaft support portion such that the inner circumferential surface of the shaft support portion and the outer circumferential surface of the drive shaft have no gap therebetween. As illustrated in FIG. 11G and Table in FIG. 12, no engagement protrusions are disposed.

Comparative Example 3

Figure 11H:
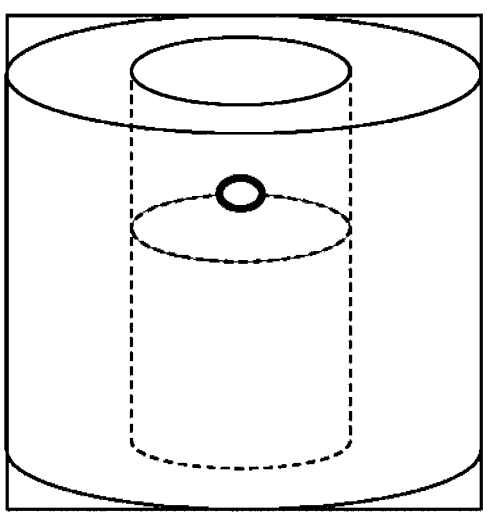
FIG. 11H is a perspective view of a shaft support portion of a flange according to Comparative Example 3.

As in Example 1, the shaft support portion of the flange in Comparative Example 3 is adjusted in terms of the diameter of the inner circumferential surface of the shaft support portion such that the inner circumferential surface of the shaft support portion and the outer circumferential surface of the drive shaft have a gap of 20 microns therebetween. As illustrated in FIG. 11H and Table in FIG. 12, only a single engagement protrusion having a height of 40 microns as in Example 1 is disposed. This configuration is different from Example 1 in terms of only the number of engagement protrusions.

Comparative Example 4

Figure 11I:
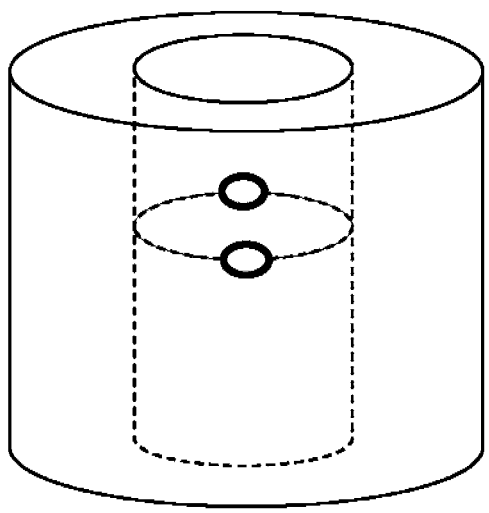
FIG. 11I is a perspective view of a shaft support portion of a flange according to Comparative Example 4.

As in Example 1, the shaft support portion of the flange in Comparative Example 4 is adjusted in terms of the diameter of the inner circumferential surface of the shaft support portion such that the inner circumferential surface of the shaft support portion and the outer circumferential surface of the drive shaft have a gap of 20 microns therebetween. As illustrated in FIG. 11I and Table in FIG. 12, only two engagement protrusions having a height of 40 microns as in Example 1 are equally arranged in the circumferential direction. This configuration is different from Example 1 in terms of only the number of engagement protrusions.

Comparative Example 5

Figure 11J:
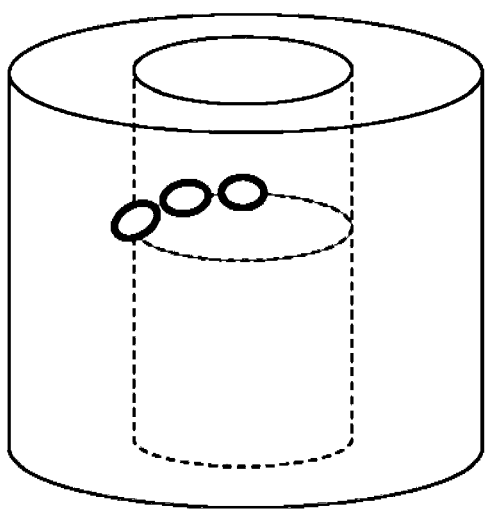
FIG. 11J is a perspective view of a shaft support portion of a flange according to Comparative Example 5.

As in Example 1, the shaft support portion of the flange in Comparative Example 5 is adjusted in terms of the diameter of the inner circumferential surface of the shaft support portion such that the inner circumferential surface of the shaft support portion and the outer circumferential surface of the drive shaft have a gap of 20 microns therebetween. As illustrated in FIG. 11J and Table in FIG. 12, three engagement protrusions having a height of 40 microns as in Example 1 are unequally arranged in the circumferential direction. This configuration is different from Example 1 in that the engagement protrusions are not equally arranged.

Evaluations

In each of Example 1 to Example 5 and Comparative Example 1 to Comparative Example 5, the flanges were press-fit. The resultant photoconductor was measured in terms of runout. Specifically, a laser displacement meter LS-7600 (manufactured by Keyence Corporation) was used as a measurement instrument to measure the circumferential runout of the drum. The measurement was performed by measuring runout values at F position (20 mm from an end of the drum), C position (186 mm from the end of the drum), and R position (352 mm from the end of the drum), and the measured values were averaged.

In addition, each of photoconductors in Example 1 to Example 5 and Comparative Example 1 to Comparative Example 5 was mounted on a Cyan process UN of a digital copier (manufactured by Sharp Corporation; MX-6170FN). Five A3-sized sheets were output so as to have a halftone image (without image processing) without being subjected to image processing for reducing image unevenness such as error diffusion. Other five A3-sized sheets were output so as to have a halftone image (with image processing) subjected to error-diffusion image processing. These images were evaluated.

In addition, evaluation of workability was performed: in a simulation of exchanging photoconductors, which are consumable supplies, detachability of the drive shaft (ease of insertion and withdrawal) was determined.

The results were evaluated in accordance with the following evaluation grades.

Runout

For the average runout of the three F, C, and R positions, examples having an average runout of 0 to 25 µm were evaluated as "VG"; examples having an average runout of 25 to 40 µm were evaluated as "G"; and examples having an average runout of 40 µm or more were evaluated as "B".

Image Quality Evaluation

Examples having no density unevenness were evaluated as "VG"; examples in which images without image processing had density unevenness, but images with image processing did not have density unevenness were evaluated as "G"; and examples having density unevenness were evaluated as "B".

Workability

Examples in which insertion and withdrawal of the drive shaft were highly facilitated were evaluated as "VG"; examples in which the insertion and withdrawal were facilitated were evaluated as "G"; and examples in which the insertion and withdrawal were difficult were evaluated as "B".

Overall Evaluation

Overall evaluation was performed such that examples having one or more "B" were evaluated as "B"; other examples having one or more "VG" were evaluated as "VG"; and the other examples were evaluated as "G".

As described in Table in FIG. 12, Comparative Example 1 had poor results in terms of runout and image quality evaluation because no engagement protrusions were disposed in the inner-circumferential shaft-support portion of the drum flange, and the central axis of the drive shaft was not held. By contrast, the photoconductor drums provided by press-fitting the flanges of Examples 1 to 5 had good results in terms of runout and image quality evaluation because engagement protrusions were disposed in the inner circumferential portion, and the central axis of the drive shaft was held. Comparative Example 2 had a poor result in terms of workability because the gap width was 0 mm between the inner circumference of the flange and the outer circumference of the drive shaft, and the insertion and withdrawal of the drive shaft were very difficult. By contrast, the photoconductor drums provided by press-fitting the flanges of Examples 1 to 5 had good results in terms of workability because engagement protrusions were disposed in the inner circumferential portion, which resulted in a decrease in the contact area with the outer circumference of the drive shaft, so that the insertion and withdrawal of the drive shaft was facilitated.

The photoconductor drums provided by press-fitting the flanges of Comparative Example 3 and Comparative Example 4 had poor results in terms of runout and image quality evaluation because less than three engagement protrusions were disposed in the inner circumferential portion of the flange, and the central axis of the drive shaft was not held.

The photoconductor drum provided by press-fitting the flange of Comparative Example 5 had poor results in terms of runout and image quality evaluation because three engagement protrusions in the inner circumferential portion were arranged one-sidedly in the circumferential direction, and the central axis of the drive shaft was not held. However, Comparative Example 5 had the poor results because the engagement protrusions were arranged one-sidedly in the circumferential direction. Comparative Example 5, in which the engagement protrusions were arranged one-sidedly in the circumferential direction, is an extreme example of unequally arranging engagement protrusions. Even when engagement protrusions are arranged unequally to some extent, as long as, in a cross section of the drive shaft, two-dimensional forces applied by the engagement protrusions are balanced to some extent, good results can be provided. In other words, as long as the resultant force is zero to not more than a predetermined value, good results can be provided.

The photoconductor drum provided by press-fitting the flange of Example 2 provided better result in terms of runout, which resulted in enhanced image quality, because engagement protrusions disposed on the leading-end side increased the holding power for the drive shaft. Example 3 provided better results in terms of runout and image quality because leading-end-side engagement protrusions were provided and these leading-end-side engagement protrusions were larger than the trailing-end-side engagement protrusions. In Example 4, the photoconductor drum was provided by press-fitting a flange having engagement protrusions on ribs, so that sinking of the engagement protrusions was suppressed, and the central axis of the drive shaft was held with higher stability. In Example 5, the photoconductor drum was provided by press-fitting a flange having engagement protrusions in a helical arrangement; the drive shaft was more easily inserted, and the central axis of the drive shaft was held.

The present disclosure can also be implemented in other various ways without departing from the spirit and scope thereof. Thus, the above-described embodiments are mere examples, and should not be understood as limiting. The scope of the present disclosure is indicated by Claims, and not limited at all by the descriptions in the specification. Any changes and modifications within the equivalent scope of Claims fall within the scope of the present disclosure.

The present disclosure is applicable to photoconductor drums. The present disclosure is also applicable to, in addition to photoconductor drums, configurations in which a rotatable body is drivingly rotated by a drive shaft.

The present disclosure contains subject matter related to that disclosed in Japanese Priority Patent Application JP 2017-217481 filed in the Japan Patent Office on Nov. 10, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A photoconductor drum comprising:
    a drum body that is cylindrical; and
    a pair of flanges fitted to or near two axial ends of the drum body,
    wherein at least one of the flanges includes a plurality of engagement protrusions disposed on an inner circumferential surface of a through-hole for inserting a drive shaft for drivingly rotating the photoconductor drum, the through-hole having a larger radius than the drive shaft, and
    wherein, in each of the flanges, the engagement protrusions are disposed so as to correspond to a single position or a plurality of positions in an axial direction.

2. The photoconductor drum according to claim 1,
    wherein, while the drive shaft is not inserted into the through-hole, a length obtained by subtracting a height of each of the engagement protrusions from the radius of the through-hole is smaller than a radius of the drive shaft, and
    the engagement protrusions are deformed to allow insertion of the drive shaft into the through-hole.

3. The photoconductor drum according to claim 1, wherein when the engagement protrusions are disposed so as to correspond to the plurality of positions in the axial direction, the engagement protrusions include one or more engagement protrusions for each of the plurality of positions in the axial direction.

4. The photoconductor drum according to claim 1, wherein the plurality of engagement protrusions are arranged, on the inner circumferential surface of the through-hole, in a helix that extends in an axial direction of the through-hole.

5. The photoconductor drum according to claim 1, wherein a plurality of sets of the engagement protrusions are disposed in a plurality of positions of each of the flanges in an axial direction, and a height of a first set of the engagement protrusions are lower than a height of a second set of the engagement portions, the first set of the engagement protrusions being disposed closer to the axial end of the drum body than the second set of the engagement protrusions.

6. The photoconductor drum according to claim 1, wherein each of the flanges includes ribs, and the engagement protrusions are arranged, in a circumferential direction, in positions corresponding to the ribs.

7. The photoconductor drum according to claim 1, wherein two groove portions into which a parallel pin is insertable are formed in each of the flanges, the parallel pin being inserted into a diametral through-hole of the drive shaft.

8. The photoconductor drum according to claim 7,
    wherein each of the flanges includes drive protrusions in positions adjacent to, in a circumferential direction, the two groove portions into which the parallel pin is insertable, and
    the drive protrusions have lower strength than the engagement protrusions.

9. The photoconductor drum according to claim 1, wherein the engagement protrusions are equally distributed in a circumferential direction.

10. The photoconductor drum according to claim 1, wherein the engagement protrusions are three or more engagement protrusions.

11. A photoconductor drum system comprising:
    the photoconductor drum according to claim 1; and
    a drive shaft for drivingly rotating the photoconductor drum.

12. An image-forming apparatus comprising the photoconductor drum system according to claim 11.

13. A multifunction apparatus comprising the photoconductor drum system according to claim 11.

14. A rotatable body comprising at least two flanges including a plurality of engagement protrusions disposed on an inner circumferential surface of a through-hole for inserting a drive shaft for drivingly rotating the rotatable body, the through-hole having a larger radius than the drive shaft,
- wherein, in each of the at least two flanges, the engagement protrusions are disposed so as to correspond to a single position or a plurality of positions in an axial direction.

15. A rotatable body system comprising:
the rotatable body according to claim 14; and
a drive shaft for drivingly rotating the rotatable body.

16. A rotatable body system comprising:
a rotatable body including at least two flanges; and
a drive shaft for drivingly rotating the rotatable body, the drive shaft being inserted into a through-hole of the at least one flange, the through-hole having a larger radius than the drive shaft,
- wherein, each of the at least two flanges includes a plurality of engagement protrusions disposed between the through-hole and the drive shaft, and
- wherein, in each of the at least two flanges, the engagement protrusions are disposed so as to correspond to a single position or a plurality of positions in an axial direction.

* * * * *